United States Patent [19]

Shimada et al.

[11] Patent Number: 4,608,914

[45] Date of Patent: Sep. 2, 1986

[54] INTAKE UNIT

[75] Inventors: Yukio Shimada, Ebina; Shizuo Kato, Saitama; Katsuichiro Tajima, Sano, all of Japan

[73] Assignee: Nihon Radiator Co., Ltd., Tokyo, Japan

[21] Appl. No.: 745,072

[22] Filed: Jun. 17, 1985

Related U.S. Application Data

[63] Continuation of Ser. No. 536,668, Sep. 28, 1983, abandoned.

[30] Foreign Application Priority Data

Sep. 30, 1982 [JP] Japan ................................. 57-147244

[51] Int. Cl.⁴ ............................................... B60H 1/26
[52] U.S. Cl. ...................................... 98/2.06; 98/2.07
[58] Field of Search .................. 98/2, 2.01, 2.05, 2.06, 98/2.07, 2.08, 2.11

[56] References Cited

U.S. PATENT DOCUMENTS

| | | | |
|---|---|---|---|
| 2,185,486 | 1/1940 | Wahlberg | 98/2.07 |
| 2,295,750 | 9/1942 | Horris et al. | 98/2.07 |
| 2,650,534 | 9/1953 | Schneider | 98/2.01 |
| 2,832,277 | 4/1958 | Simons et al. | 98/2.06 |
| 3,288,048 | 11/1966 | Laing | 98/2.07 |
| 3,387,549 | 6/1968 | de Coye de Castelet | 98/2.07 |
| 4,227,569 | 10/1980 | Wattin | 237/12.3 A X |

*Primary Examiner*—Harold Joyce
*Attorney, Agent, or Firm*—Gordon W. Hueschen

[57] ABSTRACT

An intake unit for an automobile air conditioner comprising a blower section incorporating a blower and an intake section incorporating at least an ambient air inlet and designed for connection to a heater unit incorporating a heater core, which intake unit is provided with a bypass capable of forwarding ambient air to said heater unit without allowing it to pass through said blower section and a bypass door capable of opening said bypass only while said blower is not in operation.

8 Claims, 7 Drawing Figures

INTAKE UNIT

This is a continuation of application Ser. No. 536,668, filed Sept. 28, 1983, which is abandoned.

BACKGROUND OF THE INVENTION

1. Field of the Invention

This invention relates to an intake unit. More particulary this invention relates to improvements in and concerning an air intake unit for an air conditioner in an automobile.

2. Description of Prior Arts

Generally, the air conditioner for use in the automobile mainly comprises an intake unit incorporating a blower, a cooler unit incorporating an evaporator and a heater unit incorporating a heater core. The air conditioner keeps the air inside the automobile comfortable for the driver and passengers by causing the intake unit to admit the air outside the automobile or the air inside the automobile or a mixture thereof, then the cooler unit to cool the incoming air, and the heater unit to heat or not to heat the whole or part of the cooled air as occasion demands and releases the air in the form of a draft of a desired temperature into the automobile interior.

When the climatic conditions under which the automobile equipped with the air conditioner is presently operated are varied notably from standard conditioner, the air conditioner conditions is required to have its construction altered to suit the particular climatic conditions. In the district in which the atmospheric temperature does not appreciably rise in the summer and no use is found for the cooler unit of the air conditioner, for example, the air conditioner in the automobile is more often than not supplied in the form of a car heater which leaves out a cooler unit and connects an intake unit 1 incorporating a blower 4 and a heater unit 3 incorporating a heater core 5 to each other with a heater duct 2 as illustrated in FIG. 1. In this case, the car heater is expected to keep the automobile interior in a comfortable atmosphere by allowing the air inside the automobile to be spontaneously ventilated by virtue of the ram pressure which is generated by the travel of the automobile. Unfortunately, the car heater has a disadvantage that the blower 4 which is at rest inside the blower section of the intake unit 1 offers resistance to the flow of air and consequently interferes with the spontaneous ventilation of the air inside the automobile. A solution of this disadvantage has been offered by a modified car heater which is provided with a duct outlet exclusively used for ram pressure ventilation so that the ambient air may be directly blown into the automobile interior without being passed through a blower, for example. This modified car heater, however, is incapable of utilizing the ram pressure except for the purpose of ventilation and also incapable of adjusting the outlet temperature of the incoming air. The practice of preparing intake units and outlets in constructions specially designed to suit varying climatic conditions under which automobiles equipped with car heaters are operated proves disadvantageous from the economic point of view because it fails to enjoy the merit of cost reduction due to mass production of parts of common use.

OBJECT OF THE INVENTION

An object of this invention, therefore, is to provide an improved intake unit for the automobile air conditioner. Another object of this invention is to provide an intake unit which accomplishes comfortable ventilation of the automobile interior by making effective use of the ram pressure without requiring provision of an outlet exclusively for ram pressure ventilation and which allows the ram pressure to be brought into the automobile air conditioner so as to be utilized for purposes other than ventilation. Yet another object of this invention is to provide an intake unit which may be incorporated into the automobile conditioner to serve concurrently as an entrance for the air from both inside and outside the automobile and permit ventilation by the use of the ram pressure.

SUMMARY OF THE INVENTION

The objects described above are accomplished by providing an automobile air conditioner with an intake unit comprising a blower section incorporating a blower and an intake section provided with at least an inlet for ambient air and connected to a heater unit incorporating a heater core, which intake unit is characterized by being provided with a bypass capable of delivering the ambient air to the heater unit without requiring it to be sent through the aforementioned blower section and a bypass door capable of opening the aforementioned bypass only when the aforementioned blower is not in operation.

In this intake unit, the aforementioned bypass door is relatively light and is constructed so that it may be opened by the ram pressure and closed by the pressure difference which occurs between the intake section side and the heater unit side when the blower is in operation. Further, this intake unit is provided with an inlet for the interior air, an inlet for the ambient air, and an intake door capable of selectively opening and closing these intakes.

PREFERRED EMBODIMENT OF THE INVENTION

Figure 1:
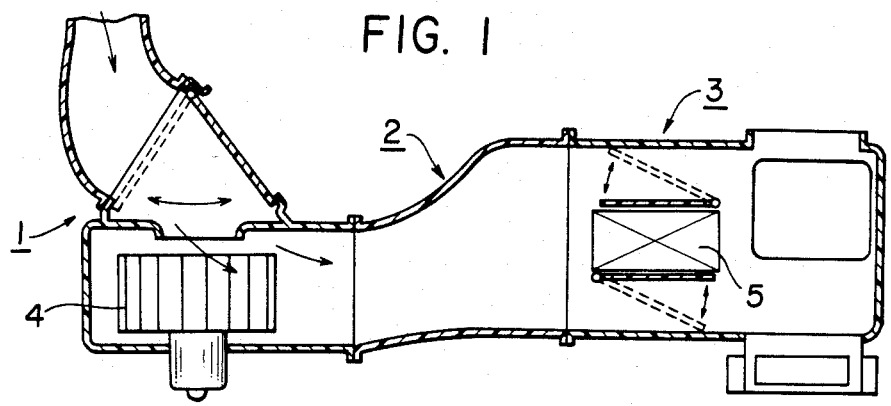
FIG. 1 is a schematic cross section illustrating a conventional car heater capable of ventilating an automobile interior by means of ram pressure.
Figure 2:
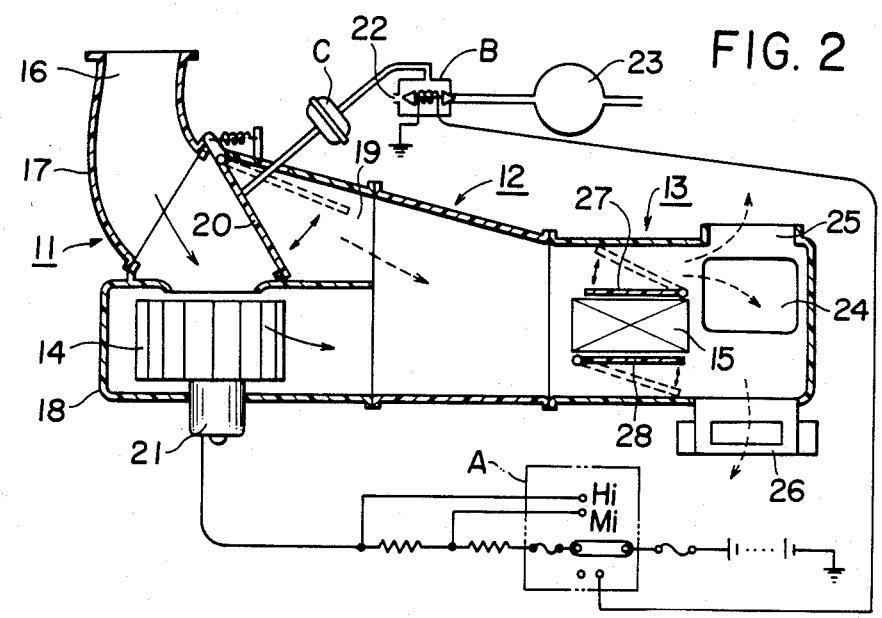
FIG. 2 is a schematic cross section illustrating a car heater incorporating an intake unit according to the present invention.

Now, the present invention will be described in detail below with reference to one embodiment illustrated in the accompanying drawing. FIG. 2 is a schematic diagram illustrating a car heater, i.e., an automobile air conditioner incorporating an intake uhnit of the present invention. This car heater has an intake unit 11 of this invention connected with a heater duct 12 to a known heater unit 13 incorporating a heater core 15. The intake unit 11 comprises an intake section 17 possessing a normally opened inlet 16 for ambient air and a blower section 18 incorporating a blower 14, so that the ambient air is introduced through the aforementioned inlet 16 and delivered to the heater unit 13 in the rear part of the car heater. In the aforementioned intake section 17, there is formed a bypass 19 adapted to guide the incoming ambient air directly to the heater unit 13 without allowing it to be sent through the blower section 18. The bypass 19, by a bypass door 20 incorporated therein, is closed while the blower 14 is in operation so as to preclude otherwise possible circulation of air inside the heater. Only when the blower 14 is not in operation, the bypass 19 is kept opened to a fixed aperture without reference to the magnitude of the ram pressure. The bypass door 20 is opened or closed exclusively by a link mechanism or an actuator which is interlocked with a changeover switch of the blower 14. In the embodiment illustrated herein, the bypass 19 is set up so that when a changeover switch A of the blower 14 is turned and set to the position for stopping a motor 21 serving to rotate the blower 14, a solenoid valve B closes an air orifice 22 and forwards negative pressure from a negative pressure source 23 to an actuator C and consequently enables the bypass door 20 linked to the actuator C to open the bypass 19.

The heater duct 12, when the cooler unit (not shown) is removed from the air conditioner, forms a flow path for connecting the intake unit 11 and the heater unit 12 on behalf of the cooler unit and connects the blower section 18 and the bypass 19 airtightly to the heater unit 12. The present embodiment is a car heater of the type involving no circulation of the interior air, which is intended for use in the district where the atmospheric temperature does not appreciably rise and, therefore, the use of a car cooler is found only wasteful even during the summer season. The introduction of air into the automobile interior is stopped by means of a grille (not shown) which is provided in the inlet for air concurrently to fulfill the purpose of directing the flow of the incoming air. Optionally, there may be provided an intake door adapted exclusively to stop the introduction of ambient air.

The intake unit 11 constructed as described above is connected, as illustrated in FIG. 2, to the heater unit 13 through the medium of the heater duct 12. If, in this case, the blower 14 is stopped while the automobile is in motion, then the bypass door 20 is opened by the actuator C which operates when the blower switch A is turned off, with the result that the ambient air is delivered through the bypass 19 and the heater duct 12 without entailing any appreciable resistance. By allowing this ambient air to take its own course and flow out of an existing vent duct outlet 24, the automobile interior can be naturally ventilated and allowed to retain a comfortable atmosphere. Moreover, since this car can rely for liberation of ram pressure upon any of the existing air outlets, i.e., the vent duct outlet 24, a defrost duct outlet 25 and a floor duct outlet 26, and is not required to possess any special outlet of its own exclusively for ram pressure, it permits economization of parts and simplification of overall construction. Further, the car heater can heat the automobile interior and defrost the window glasses by closing heater doors 27, 28 and causing the aforementioned incoming ambient air to be passed through the heater core 15, heated within the heater unit 13 to a desired temperature, and blown out of the floor duct outlet 26 or defrost duct outlet 25. In this case, this car heater provides desired space heating in the automobile interior without requiring the operation of the blower. Thus, the space heating is obtained at a notably low power consumption.

Figure 3:
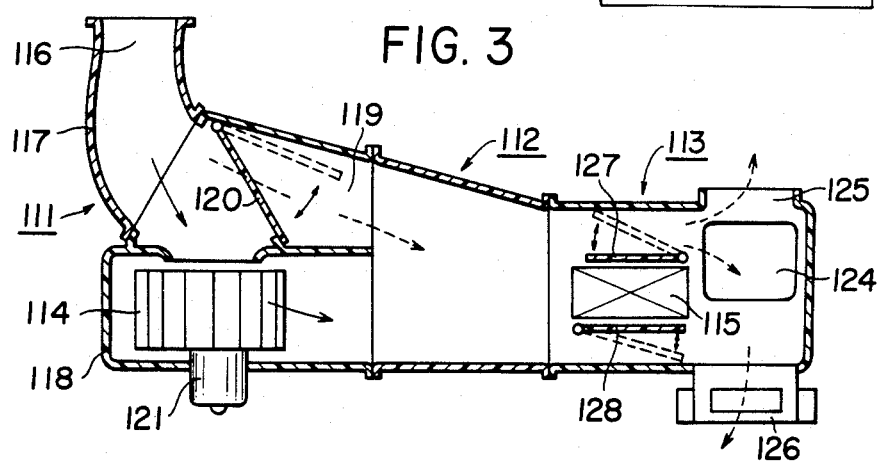
FIG. 3 is a schematic cross section illustrating another typical intake unit of the present invention.

FIG. 3 illustrates another embodiment of this invention, wherein a bypass door 120 is destitute of a mechanism designed exclusively for opening and closing the bypass door 120. The omission of such a special mechanism is accomplished by forming the bypass door 120 with a material of light weight such as, for example, polypropylene, ABS resin, nylon or other similar synthetic resin, so that this door may be closed or opened by variation of the pressure within an intake section 117. In the case of the bypass door 120 constructed as described above, since the pressure inside the intake section 117 is lower than that of a heater unit 113 side while a blower 114 is in operation, the bypass door 120 is closed by the pressure difference. When ram pressure is exerted while the blower 114 is not in operation, the bypass door 120 is opened to an aperture which is proportional to the magnitude of the ram pressure so exerted. In FIG. 3, the numerical symbols which are the sums of the numerical symbols used in FIG. 2 plus 100 stand for like parts, which fulfill like functions.

An intake unit 111 constructed as described above is connected, as illustrated in FIG. 3, to the heater unit 113 through the medium of a heater duct 112. If, in this case, the blower 114 is stopped while the automobile is in motion, the bypass door 120 is pushed open by ram pressure because of the resistance offered by the blower 114, with the result that the ambient air is forwarded through a bypass 119 and the heater duct 112 without entailing any noticeable resistance. The other parts of the car heater function in the same manner as the like parts of FIG. 2. In this case, since the car heater can provide desired space heating in the automobile interior by virtue of ram pressure without requiring the operation of the blower, the space heating is accomplished at a notably low power consumption.

Figure 4:
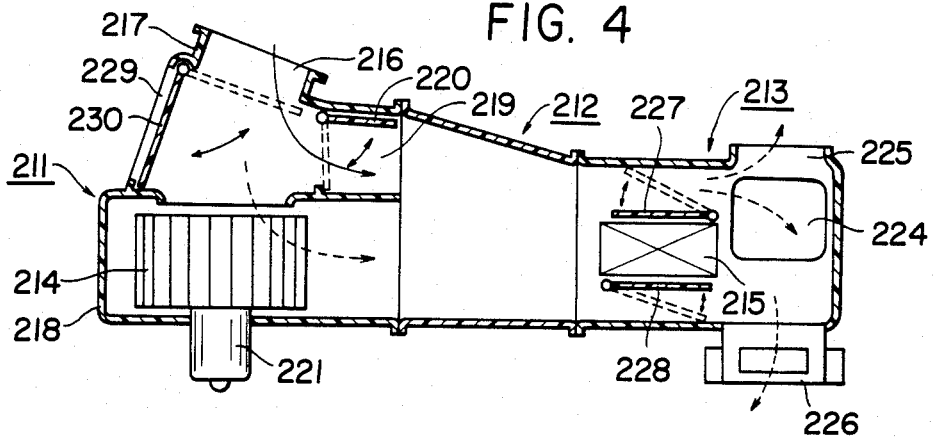
FIG. 4 is a schematic cross section illustrating yet another typical intake unit of the present invention.

FIG. 4 illustrates yet another embodiment of this invention. An intake unit 211 used in the present embodiment is of a type using an inlet 229 for interior air besides an inlet 216 for ambient air and, therefore, permitting circulation of interior air. Thus, similarly to the intake units 11, 111 illustrated in FIG. 2 and FIG. 3, this intake unit 211 is formed either integrally or separately of an intake section 217 and a block section 218 incorporating a blower 214. Unlike the intake sections 17, 117 illustrated in FIG. 2 and FIG. 3, this intake section 217 has the inlet 216 for ambient air and the inlet 229 for interior air open adjacently and, at the same time, is provided with an intake door 230 for selectively opening or closing either of the two inlets. This intake door 230 is so adapted that the position thereof may be freely switched by drive means of prior art such as, for example, a control cable or negative pressure operated by an intake lever (not shown) provided on an instrument panel.

The aforementioned intake section 217, similarly to the counterparts illustrated in FIG. 2 and FIG. 3, has formed therein a bypass 219 incorporating a bypass door 220. The bypass door 220 in this bypass 219 may be operated, similarly to the counterpart illustrated in FIG. 2, by a mechanism interlocked with a blower switch A so as to open the bypass only while the blower 214 is not in operation. When the operation of the blower 214 is stopped and the inlet 216 for ambient air is opened, therefore, the ambient air introduced by ram pressure is passed through the opened bypass 219 and directly forwarded to a heater unit 213. This air is adjusted to a desired temperatuee by being passed or not passed through a heater core 215 and is then blown into the automobile interior. Thus, the present embodiment can be utilized for heating the automobile interior or defrosting the window glasses as well as for naturally ventilating the automobile interior. While the blower 214 is in operation, the aforementioned bypass door 220, similarly to the counterpart illustrated in FIG. 3, is closed by pressure difference because the pressure inside the intake section 217 is lower than on the heater unit 213 side. While the blower 214 is not in operation and ram pressure is exerted, the bypass door 220 is opened to an aperture proportional to the magnitude of the ram pressure so exerted. The numerical symbols which are the sums of the numerical symbols used in FIG. 2 plus 200 stand for like parts, which fulfill like functions.

Figure 5:
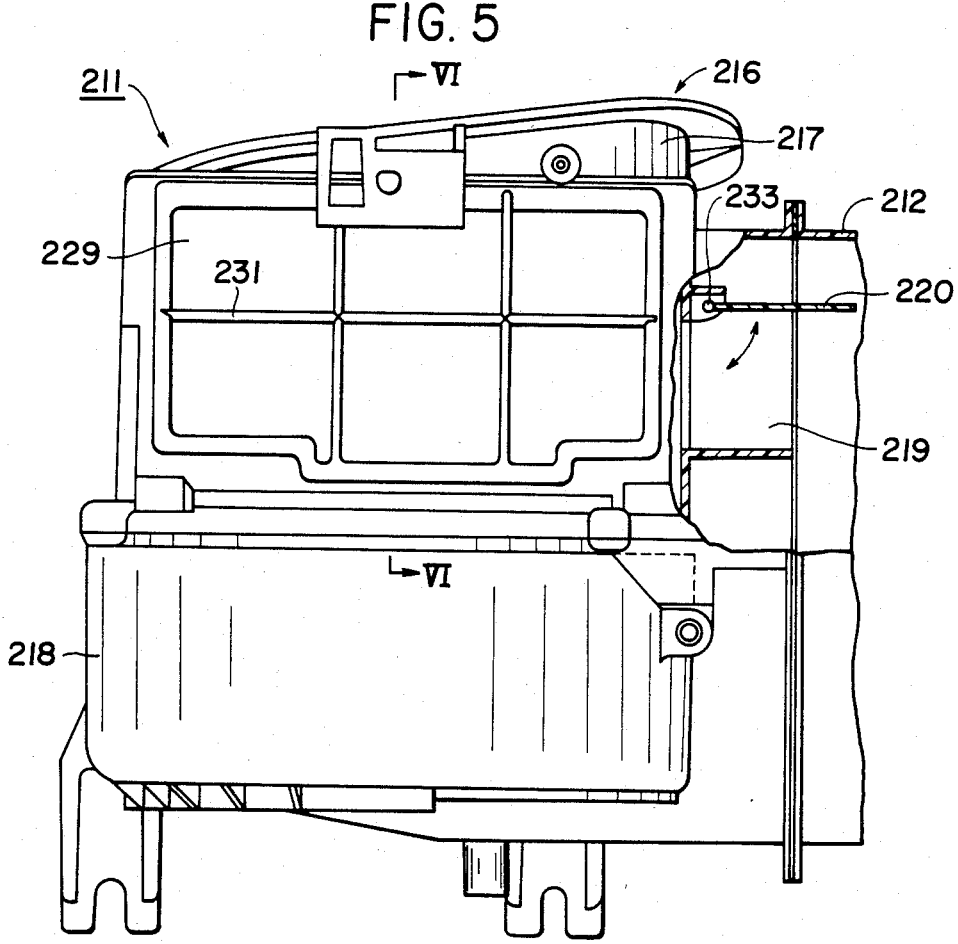
FIG. 5 is a side view illustrating a further typical intake unit of the present invention.
Figure 6:
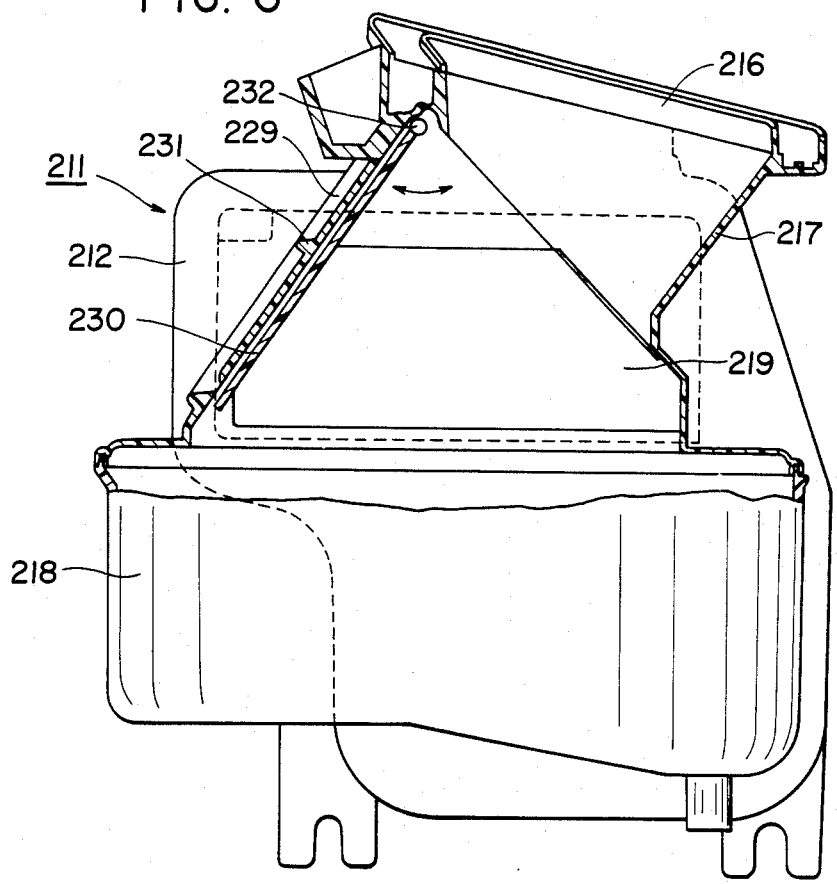
FIG. 6 is a cross section taken along the line VI—VI in the diagram of FIG. 5.

FIG. 5 and FIG. 6 more specifically illustrate the intake unit 211 of FIG. 4. The intake unit 211 comprises the intake section 217 having formed adjacently to the ambient air inlet 216 an interior air inlet 229 incorporating a grille 231 and the blower section 218 incorporating a blower (not shown) connected to the aforementioned intake section 217. To this intake section 217, the intake door 230 adapted to open or close selectively either the ambient air inlet 216 or the interior air inlet 229 is pivotally attached with a fixing shaft 232. Further, in this intake section 217, there is formed the bypass 219 which communicates with a heater duct 212 connected to the intake unit 211, for example. To the bypass 219, the bypass door 220 which is freely opened and closed, is pivotally attached with a fixing shaft 233.

Figure 7:
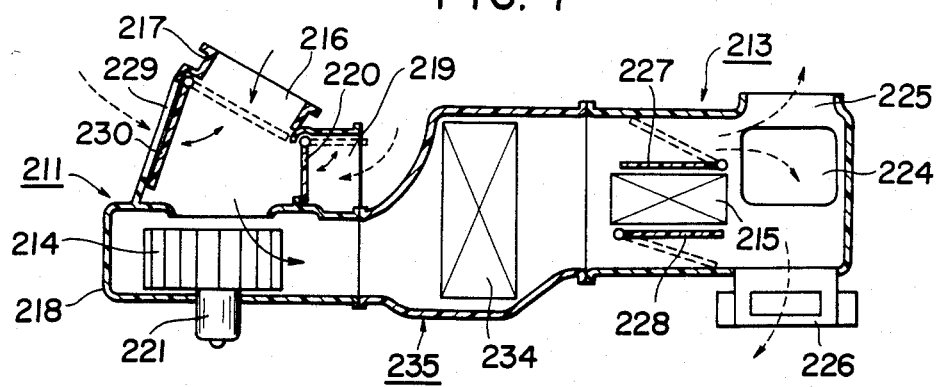
FIG. 7 is a schematic cross section illustrating a typical application of the intake unit of the present invention.

FIG. 7 illustrates a typical application in which the intake unit 211 illustrated in FIGS. 4–6 is connected to the heater unit 213 through the medium of a cooler unit 235 incorporating an evaporator 234. To be specific, the discharge end of the blower 214 and the heater unit 213 are connected to each other through the medium of the cooler unit 235 in such a manner that when the bypass 219 is to be opened, the bypass door 220 is allowed to be interlocked with the intake door 230 and opened only during the introduction of interior air by a mechanism which operates independently of the operation of the blower 214. In this case, the bypass 219 can be utilized as a secondary interior air inlet which opens only during the introduction of interior air and, therefore, contributes to increasing the volume of air during the circulation of interior air.

When the intake unit constructed as described above is designed as a car heater, it can ventilate and heat the automobile interior and defrost the window glasses by introducing ambient air with the aid of ram pressure. Simply by substituting the intake section and the heater duct with the cooler unit without requiring any other alteration of design, this car heater can be converted into an automobile air conditioner.

As clearly noted from the description given above, this invention relates to an intake unit for an automobile air conditioner comprising a blower section incorporating a blower and an intake section incorporating at least an ambient air inlet and designed for connection to a heater unit incorporating a heater core, which intake unit is provided with a bypass capable of allowing ambient air to be forwarded to the heater unit side without being passed through the aforementioned blower section and a bypass door capable of opening the bypass only when the blower is not in operation. The intake unit, therefore, can utilize ram pressure to introduce ambient air and directly forward it to the heater unit instead of being passed through the blower. By utilizing the existing outlet of the heater unit, it can advantageously ventilate the automobile interior. By optional heating in the heater unit and proper selection from among the outlets, it can heat the automobile interior and defrost the window glasses without requiring the operation of the blower. Further, when the intake unit of this invention is used in the automobile air conditioner, this air conditioner can be converted into a car heater capable of ram-pressure ventilation simply by incorporating, in the place of the cooler unit, the heater duct incorporating a bypass as well as a blower section. In short, this invention enables a car heater capable of ram-pressure ventilation and an automobile air conditioner incorporating a cooler unit to share the common use of the intake unit.

What is claimed is:

1. An automobile air conditioner comprising a heater unit incorporating a heating core;
   an air intake unit having a blower section incorporating a blower and an intake section incorporating at least an ambient air inlet;
   and conduit means connecting said air intake section with said heater unit which includes a bypass section for bypassing said blower and a bypass door for opening and closing said bypass section; said bypass door being closed when said blower is operating and being capable of opening said bypass only while said blower is not in operation.

2. An automobile air conditioner according to claim 1, which further comprises heater core bypass channel means for bypassing said heater core, and heater bypass door means for blocking said bypass channels to force the flow of the air to be conditioned through said heater core.

3. An automobile air conditioner according to claim 1, which further comprises an interior air inlet and an ambient air inlet and an intake door capable of selectively opening and closing said inlets.

4. An automobile air conditioner according to claim 1, wherein said blower is turned on and off by a switch and said bypass door is constructed so as to be opened and closed by an actuator which is actuated when said switch is in the off position.

5. An automobile air conditioner comprising a heater unit incorporating a heating core;
   an air intake unit having a blower section incorporating a blower and an intake section incorporating at least an ambient air inlet;
   and conduit means connecting said air intake section with said heater unit which includes a bypass section for bypassing said blower and a bypass door for opening and closing said bypass section; said bypass door being closed when said blower is operating and being capable of opening said bypass only while said blower is not in operation and wherein said said blower is turned on and off by a switch and said bypass door is constructed so as to be opened and closed by an actuator which is actuated when said switch is in the off position.

6. An automobile air conditioner comprising a heater unit incorporating a heating core;
   an air intake unit having a blower section incorporating a blower and an intake section incorporating at least an ambient air inlet;
   a bypass section incorporating a bypass door for opening and closing said bypass; and conduit means connecting said air intake section with said heater unit; said bypass door being capable of opening said bypass only while said blower is not in operation;

wherein said bypass door has a relatively light weight and is constructed in such a manner that it will be opened by ram pressure when the automobile is moving and when the blower is not in operation and will be closed by the pressure difference which occurs between the interior of the intake section and said conduit means when the blower is in operation, even though the automobile is moving; and wherein said blower is turned on and off by a switch and said bypass door is constructed so as to be opened and closed by an actuator which is actuated when said switch is in the off position.

7. An automobile air conditioner comprising an air intake unit and a heating unit having a core; and conduit means incorporating a blower means for conducting air from said intake unit to said heating unit;

said conduit means having first bypass-gate means which can be opened and closed to decrease or increase respectively the flow of air through the core of said heating unit and otherwise being free of any obstruction which would prevent free access of air to said heat unit and passage through the core thereof and second bypass-gate means which, when open, allows air to bypass said blower means, and means operative only when said blower means is turned off for opening said second bypass-gate means.

8. An automobile air conditioner according to claim 7, which further comprises an interior air inlet in addition to said ambient air inlet and an intake door capable of selectively opening and closing said inlets, and in which said intake door in one position closes said interior air inlet and opens an ambient air inlet and in another position opens said interior air inlet and closes an ambient air inlet.

* * * * *